US010774935B2

(12) United States Patent
Hoogendoorn et al.

(10) Patent No.: US 10,774,935 B2
(45) Date of Patent: Sep. 15, 2020

(54) ADJUSTABLE FLOW REGULATOR

(71) Applicant: Phoenix Industries Pty Ltd., Bayswater (AU)

(72) Inventors: John Henri Hoogendoorn, Bayswater (AU); Andrew John Cocks, Bayswater (AU); Ban Hsi Liu, Bayswater (AU); Stephen Frank Pedulla, Bayswater (AU)

(73) Assignee: Phoenix Industries Pty Ltd., Bayswater, Victoria (AU)

(*) Notice: Subject to any disclaimer, the term of this patent is extended or adjusted under 35 U.S.C. 154(b) by 284 days.

(21) Appl. No.: 16/063,744

(22) PCT Filed: Jan. 14, 2016

(86) PCT No.: PCT/AU2016/050013
§ 371 (c)(1),
(2) Date: Jun. 19, 2018

(87) PCT Pub. No.: WO2017/120632
PCT Pub. Date: Jul. 20, 2017

(65) Prior Publication Data
US 2020/0072362 A1  Mar. 5, 2020

(51) Int. Cl.
*F16K 1/52* (2006.01)
*E03C 1/04* (2006.01)
*F16K 1/04* (2006.01)

(52) U.S. Cl.
CPC ............... *F16K 1/523* (2013.01); *E03C 1/04* (2013.01); *F16K 1/04* (2013.01);
(Continued)

(58) Field of Classification Search
CPC ....... Y10T 137/9464; Y10T 137/82823; Y10T 137/86549; Y10T 137/87917; F16K 1/523; F16K 1/04; E03C 1/04
(Continued)

(56) References Cited

U.S. PATENT DOCUMENTS 3,995,664 A     12/1976  Nelson
4,130,136 A  *  12/1978  Garnier ............... F16K 11/0782
                                                            137/375
(Continued)

FOREIGN PATENT DOCUMENTS

WO   WO 2005/016102    2/2005
WO   WO 2014/146034    9/2014

OTHER PUBLICATIONS

International Search Report for PCT/AU/2016/050013, dated Feb. 12, 2016.
Written Opinion for PCT/AU2016/050013 dated Feb. 12, 2016.

*Primary Examiner* — Marina A Tietjen
*Assistant Examiner* — Frederick D Soski
(74) *Attorney, Agent, or Firm* — Woodard, Emhardt, Henry, Reeves & Wagner, LLP

(57) ABSTRACT

The present invention provides an adjustable flow regulator for a water mixer that, when in use, is disposed in a fluid path between a mixer cartridge and a mixer outlet of the water mixer, the adjustable flow regulator comprises a regulator body having a fluid inlet in fluid communication with the mixer cartridge to receive mixed water therefrom, and a fluid outlet in fluid communication with the mixer outlet. The regulator body further comprises a control element moveable within the regulator body, wherein the control element is moveable to adjustably restrict the fluid path and thereby flow of mixed water exiting the outlet.

9 Claims, 4 Drawing Sheets

(52) U.S. Cl.
CPC .............. Y10T 137/86549 (2015.04); Y10T 137/86823 (2015.04); Y10T 137/87917 (2015.04); Y10T 137/9464 (2015.04)

(58) Field of Classification Search
USPC .......................................... 251/264, 215–216
See application file for complete search history.

(56) References Cited

U.S. PATENT DOCUMENTS

| | | | | |
|---|---|---|---|---|
| 4,475,570 A * | 10/1984 | Pike | ............ | E03B 7/12 137/218 |
| 4,548,224 A * | 10/1985 | McLaughlin | ............ | F16K 43/00 134/166 C |
| 4,827,538 A * | 5/1989 | Heimann | ............ | E03C 1/04 137/217 |
| 4,942,902 A * | 7/1990 | Knapp | ............ | F16K 11/0782 137/270 |
| 4,957,135 A * | 9/1990 | Knapp | ............ | F16K 11/0782 137/454.6 |
| 5,095,554 A * | 3/1992 | Gloor | ............ | E03C 1/104 4/678 |
| 5,095,934 A * | 3/1992 | Iqbal | ............ | F16K 11/0782 137/270 |
| 5,129,416 A * | 7/1992 | Ackroyd | ............ | E03B 9/025 137/218 |
| 5,226,453 A * | 7/1993 | Biggers | ............ | F16K 1/14 137/801 |
| 5,315,859 A | 5/1994 | Schommer | | |
| 5,375,624 A * | 12/1994 | Knapp | ............ | F16K 11/0787 137/625.17 |
| 5,417,242 A * | 5/1995 | Goncze | ............ | F16K 11/0787 137/625.17 |
| 5,494,076 A * | 2/1996 | Knapp | ............ | F16K 47/026 137/625.17 |
| 5,575,424 A * | 11/1996 | Fleischmann | ............ | E03C 1/04 137/218 |
| 5,592,971 A * | 1/1997 | Knapp | ............ | F16K 11/0782 137/625.41 |
| 5,613,521 A * | 3/1997 | Knapp | ............ | F16K 11/087 137/454.6 |
| 5,615,709 A * | 4/1997 | Knapp | ............ | F16K 11/087 137/625.41 |
| 5,664,603 A * | 9/1997 | Knapp | ............ | F16K 11/087 137/625.4 |
| 5,701,926 A * | 12/1997 | Luisi | ............ | E03C 1/04 137/218 |
| 5,740,836 A * | 4/1998 | Tang | ............ | F16K 11/087 137/625.41 |
| 5,813,435 A * | 9/1998 | Knapp | ............ | B01D 53/323 137/625.41 |
| 5,829,468 A * | 11/1998 | Watanabe | ............ | B21C 37/292 137/15.08 |
| 5,927,333 A * | 7/1999 | Grassberger | ............ | F16K 11/087 137/625.41 |
| 5,931,374 A * | 8/1999 | Knapp | ............ | F16K 11/0743 137/625.41 |
| 5,960,490 A * | 10/1999 | Pitsch | ............ | E03C 1/04 137/359 |
| 5,979,489 A * | 11/1999 | Pitsch | ............ | E03C 1/04 137/269 |
| 6,023,796 A * | 2/2000 | Pitsch | ............ | E03C 1/04 4/676 |
| 6,062,251 A * | 5/2000 | Pitsch | ............ | F16K 11/0787 137/270 |
| 6,135,151 A * | 10/2000 | Bowers | ............ | C02F 1/003 137/625.17 |
| 6,363,969 B1 * | 4/2002 | Schneider | ............ | F16K 11/0787 137/625.17 |
| 6,394,133 B1 * | 5/2002 | Knapp | ............ | E03C 1/0404 137/615 |
| 6,408,881 B2 * | 6/2002 | Lorenzelli | ............ | E03C 1/05 137/624.11 |
| 6,517,006 B1 * | 2/2003 | Knapp | ............ | F16K 3/34 137/625.41 |
| 6,808,130 B1 * | 10/2004 | Ouyoung | ............ | B05B 1/1609 239/102.1 |
| 6,981,692 B2 * | 1/2006 | Hong | ............ | E03C 1/04 137/315.11 |
| 7,753,074 B2 | 7/2010 | Rosko et al. | | |
| 7,980,268 B2 | 7/2011 | Rosko et al. | | |
| 8,578,966 B2 | 11/2013 | Thomas et al. | | |
| 8,671,984 B2 | 3/2014 | Rosko et al. | | |
| 9,103,102 B1 * | 8/2015 | Prabhakar | ............ | E03C 1/0412 |
| 2001/0011560 A1 * | 8/2001 | Pawelzik | ............ | F16K 31/605 137/801 |
| 2003/0010721 A1 * | 1/2003 | Aldred | ............ | E03C 1/04 210/694 |
| 2003/0102256 A1 * | 6/2003 | Takagi | ............ | C02F 1/288 210/101 |
| 2004/0010848 A1 * | 1/2004 | Esche | ............ | E03C 1/04 4/675 |
| 2004/0069358 A1 * | 4/2004 | Knapp | ............ | F16K 25/005 137/625.17 |
| 2004/0094213 A1 * | 5/2004 | Knapp | ............ | F16K 27/045 137/625.17 |
| 2004/0182459 A1 * | 9/2004 | Klein | ............ | E03C 1/04 137/801 |
| 2004/0221899 A1 * | 11/2004 | Parsons | ............ | E03C 1/10 137/624.11 |
| 2005/0005977 A1 * | 1/2005 | Bolgar | ............ | F16K 11/074 137/625.41 |
| 2006/0070668 A1 * | 4/2006 | Vu | ............ | F16K 19/006 137/597 |
| 2007/0131288 A1 * | 6/2007 | Moldthan | ............ | F16K 1/36 137/625.33 |
| 2008/0110512 A1 * | 5/2008 | Giagni | ............ | F16K 27/06 137/625.4 |
| 2008/0277927 A1 * | 11/2008 | Mueller | ............ | E03C 1/0404 285/272 |
| 2009/0001310 A1 * | 1/2009 | Hanson | ............ | E03C 1/04 251/366 |
| 2009/0025809 A1 * | 1/2009 | Oh | ............ | E03C 1/0404 137/801 |
| 2009/0090414 A1 * | 4/2009 | Di Nunzio | ............ | F16K 3/30 137/1 |
| 2009/0189108 A1 * | 7/2009 | Ritter | ............ | F16K 3/0227 251/304 |
| 2009/0242058 A1 * | 10/2009 | Hansen | ............ | E03C 1/0403 137/801 |
| 2010/0043898 A1 * | 2/2010 | Eckhaus | ............ | E03C 1/04 137/625 |
| 2010/0155505 A1 * | 6/2010 | Lopp | ............ | E03C 1/084 239/428.5 |
| 2010/0252115 A1 | 10/2010 | Bassols | | |
| 2011/0088784 A1 | 4/2011 | Meehan et al. | | |
| 2011/0100491 A1 * | 5/2011 | Zhirkevich | ............ | F16K 11/0782 137/625.4 |
| 2011/0308652 A1 | 12/2011 | Rosko et al. | | |
| 2014/0215709 A1 * | 8/2014 | Nightlinger | ............ | E03C 1/04 4/677 |
| 2014/0261749 A1 * | 9/2014 | Chen | ............ | E03C 1/0404 137/78.1 |
| 2015/0211646 A1 * | 7/2015 | Kemp | ............ | F16K 19/006 137/625.17 |
| 2015/0247587 A1 * | 9/2015 | Ben-Dor | ............ | F16K 11/06 74/471 XY |
| 2017/0363216 A1 * | 12/2017 | Schmitt | ............ | E03C 1/04 |
| 2018/0353376 A1 * | 12/2018 | Perrin | ............ | A61H 35/02 |

\* cited by examiner

ADJUSTABLE FLOW REGULATOR

FIELD OF THE INVENTION

The present invention relates to flow regulators for use in water mixers. A common application of water mixers may be those having a lever to control rate of flow, such as basin mixer taps, kitchen mixer taps, or bath/shower mixers.

BACKGROUND OF THE INVENTION

Flow regulators are designed to be inserted into water lines to control the rate of flow of water through the water line, and particularly, to restrict the rate of flow to a predetermined flow rate.

U.S. patent publication no. 2014/0332097 and International patent publication no. WO 2010/075943 disclose generally circular in-line flow regulating elements comprising an elastically deformable material and having an annular channel or valve adapted to regulate the flow of water therethrough. Under the pressure of inflowing water, the elastic channel or valve is caused to deform from an open position to a partially closed position to thereby restrict the flow of water. Such in-line flow regulating elements suffer from various deficiencies including not being readily accessible for maintenance or replacement. Additionally, such in-line flow regulators are limited to restricting the flow of water to a non-adjustable predetermined flow rate.

The present invention is directed to overcoming or at least ameliorating one or more deficiencies of known in-line flow regulators.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect, the present invention provides an adjustable flow regulator for a water mixer that, when in use, is disposed in a fluid path between a mixer cartridge and a mixer outlet of the water mixer, the adjustable flow regulator comprising:
  a regulator body having a fluid inlet in fluid communication with the mixer cartridge to receive mixed water therefrom, and a fluid outlet in fluid communication with the mixer outlet; and
  a control element moveable within the regulator body;
  wherein the control element is moveable to adjustably restrict the fluid path and thereby flow of mixed water exiting the outlet.

The control element preferably adjustably restricts the flow of mixed water by presenting a restriction surface to mixed water within the regulator body, which restriction surface reduces a cross-sectional area of the fluid path.

The control element is preferably moveable within the regulator body from a fully open position in which the restriction surface does not reduce the cross-sectional area of the fluid path to a fully closed position in which the restriction surface provides a maximum reduction to the cross-sectional area of the fluid path, said maximum reduction corresponding to a minimum flow rate that achieves the flow of mixed water exiting the mixer outlet.

The control element preferably has a control surface configured to receive a force to thereby move the control element within the regulator body. In an embodiment, the control element may be moved within the regulator body by a torque force from a torque-producing tool, such as a screwdriver. The control surface may include an opening dimensioned to receive the tool. In an embodiment, the opening may be a slit complementary to a flat-blade screwdriver.

The control element is preferably threadably received within an opening in the regulator body. In an embodiment, the body may be a generally cylindrical elongate body having a central channel adapted to threadably receive the control element. In this embodiment, the control element may be an elongate pin having an external thread which is threadably received by an internal thread in the central channel of the elongate regulator body.

A length of the control element is preferably greater than a length of the regulator body such that the control surface of the control element is accessible from outside the regulator body. Advantageously, this allows for the control element to be readily adjustable within the body, for example, by apply a torque force to the control surface to move the control element within the regulator body from the fully open position to the fully closed position.

A flow regulating element is preferably disposed within the fluid inlet of the regulator body. The flow regulating element is preferably a typical in-line flow regulating element, such as a Neoperl® flow-volume regulator as described in U.S. patent publication no. 2014/0332097. The flow regulating element is preferably configured to restrict the flow of mixed water entering the fluid inlet of the adjustable flow regulator to a predetermined flow rate. In various embodiments, the predetermined flow rate may be 3 to 8 L/min, but is preferably 4 L/min. The flow regulating element preferably maintains a constant flow rate irrespective of supply pressure from respective hot and cold water intakes.

Advantageously, when in use, the adjustable flow regulator is adjustable to control a landing position, for example in a basin, of mixed water exiting the mixer outlet. In an embodiment, this is achieved by restricting the flow rate of mixed water to a value between the minimum flow rate that achieves the flow of mixed water exiting the mixer outlet and the predetermined flow rate (as provided by the flow regulating element). For example, in one embodiment the flow regulating element may provide a predetermined flow rate of 4 L/min. In this embodiment, the adjustable flow regulator may be configured to adjust the flow rate between the minimum flow rate and 4 L/min. The flow rate of 4 L/min is achieved when the control element is located in the fully open position. The minimum flow rate may be, for example, between 0.2 L/min to 2 L/min.

In an alternative embodiment, the landing position of mixed water exiting the mixer outlet may be controlled by adjusting the flow rate of mixed water exiting the mixer cartridge and entering the fluid inlet of the regulator body. Preferably, the flow rate of mixed water exiting the mixer cartridge is between 14 to 18 L/min. The landing position may be controlled by altering this flow rate as desired. In this embodiment, the regulator body may or may not include a flow regulating element as described above.

In a second aspect, the present invention provides a water mixer comprising:
  a mixer body; and
  an adjustable flow regulator mounted within the mixer body, which adjustable flow regulator is operable to adjustably restrict flow of mixed water exiting the mixer body, the adjustable flow regulator including a control element that is accessible from outside the mixer body.

The water mixer may also include a mixer cartridge operable to mix water from respective hot and cold water intakes to a single mixer outlet so as to vary the proportions of hot and cold water exiting the mixer outlet, and a lever handle operably coupled to the mixer cartridge, which lever handle is mounted for rotation to left and right from a central position to control water temperature and about a transverse axis to control rate of flow from the respective hot and cold water intakes. In this embodiment, the adjustable flow regulator is preferably disposed in a fluid path between the mixer cartridge and the mixer outlet so as to adjustably restrict the flow of mixed water exiting the mixer outlet.

The adjustable flow regulator preferably further includes a regulator body having a fluid inlet in fluid communication with the mixer cartridge to receive mixed water therefrom and a fluid outlet in fluid communication with the mixer outlet. In this embodiment, the control element is preferably moveable within the regulator body to adjustably restrict the fluid path and thereby the flow of mixed water exiting the fluid outlet.

The control element of the adjustable flow regulator preferably adjustably restricts the flow of mixed water by presenting a restriction surface to mixed water within the regulator body, which restriction surface reduces a cross-sectional area of the fluid path.

The control element is preferably moveable within the regulator body from a fully open position in which the restriction surface does not reduce the cross-sectional area of the fluid path to a fully closed position in which the restriction surface provides a maximum reduction to the cross-sectional area of the fluid path, said maximum reduction corresponding to a minimum flow rate that achieves the flow of mixed water exiting the mixer outlet.

The control element preferably has a control surface configured to receive a force to thereby move the control element within the regulator body. In an embodiment, the control element may be moved within the regulator body by a torque force from a torque-producing tool, such as a screwdriver. The control surface may include an opening dimensioned to receive the tool. In an embodiment, the opening may be a slit complementary to a flat-blade screwdriver.

The control element is preferably threadably received within an opening in the regulator body. In an embodiment, the regulator body may be a generally cylindrical elongate body having a central channel adapted to threadably receive the control element. In this embodiment, the control element may be an elongate pin having an external thread which is threadably received by an internal thread in the central channel of the elongate regulator body.

A length of the control element is preferably greater than a length of the regulator body such that the control surface of the control element is accessible from outside the regulator body. Preferably, the adjustable flow regulator is housed within the mixer body such that the control surface is accessible outside the mixer body. Advantageously, this allows for the control element to be readily adjustable within the body, for example, by apply a torque force to the control surface to move the control element within the body from the fully open position to the fully closed position. Further advantageously, by providing a control surface accessible outside the mixer body, the adjustable flow regulator is readily adjustable by a person, even when the water mixer is located in situ, for example, in a bathroom vanity unit.

A flow regulating element is preferably disposed within the fluid inlet of the regulator body. The flow regulating element is preferably a typical in-line flow regulating element, such as a Neoperl® flow-volume regulator as described above. The flow regulating element is preferably configured to restrict the flow of mixed water entering the fluid inlet of the adjustable flow regulator to a predetermined flow rate. In various embodiments, the predetermined flow rate may be 3 to 8 L/min, but is preferably 4 L/min. The flow regulating element preferably maintains a constant flow rate irrespective of supply pressure from the respective hot and cold water intakes.

Advantageously, when in use, the adjustable flow regulator is adjustable to control a landing position, for example in a basin, of mixed water exiting the water mixer. In an embodiment, this is achieved by restricting the flow rate of mixed water to a value between the minimum flow rate that achieves the flow of mixed water exiting the mixer outlet and the predetermined flow rate (as provided by the flow regulating element). For example, in one embodiment the flow regulating element may provide a predetermined flow rate of 4 L/min. In this embodiment, the adjustable flow regulator may be configured to adjust the flow rate between the minimum flow rate and 4 L/min. The flow rate of 4 L/min is achieved when the control element is located in the fully open position. The minimum flow rate may be, for example, between 0.2 L/min to 2 L/min.

In an alternative embodiment, the landing position of mixed water exiting the mixer outlet may be controlled by adjusting the flow rate of mixed water exiting the mixer cartridge and entering the fluid inlet of the regulator body. Preferably, the flow rate of mixed water exiting the mixer cartridge is between 14 to 18 L/min. The landing position may be controlled by altering this flow rate as desired. In this embodiment, the regulator body may or may not include a flow regulating element as described above.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF AN EMBODIMENT

The adjustable flow regulator of the present invention is described in relation to its use in a basin mixer. Nonetheless, a skilled person will appreciate that the present adjustable flow regulator may be utilised in other water mixer designs, for example, other basin or kitchen mixers or bath/shower mixers. The regulator of the present invention is further described in international application PCT/AU2016/050013, the entire contents of which are incorporated herein by reference.

Figures 1, 2, 3:
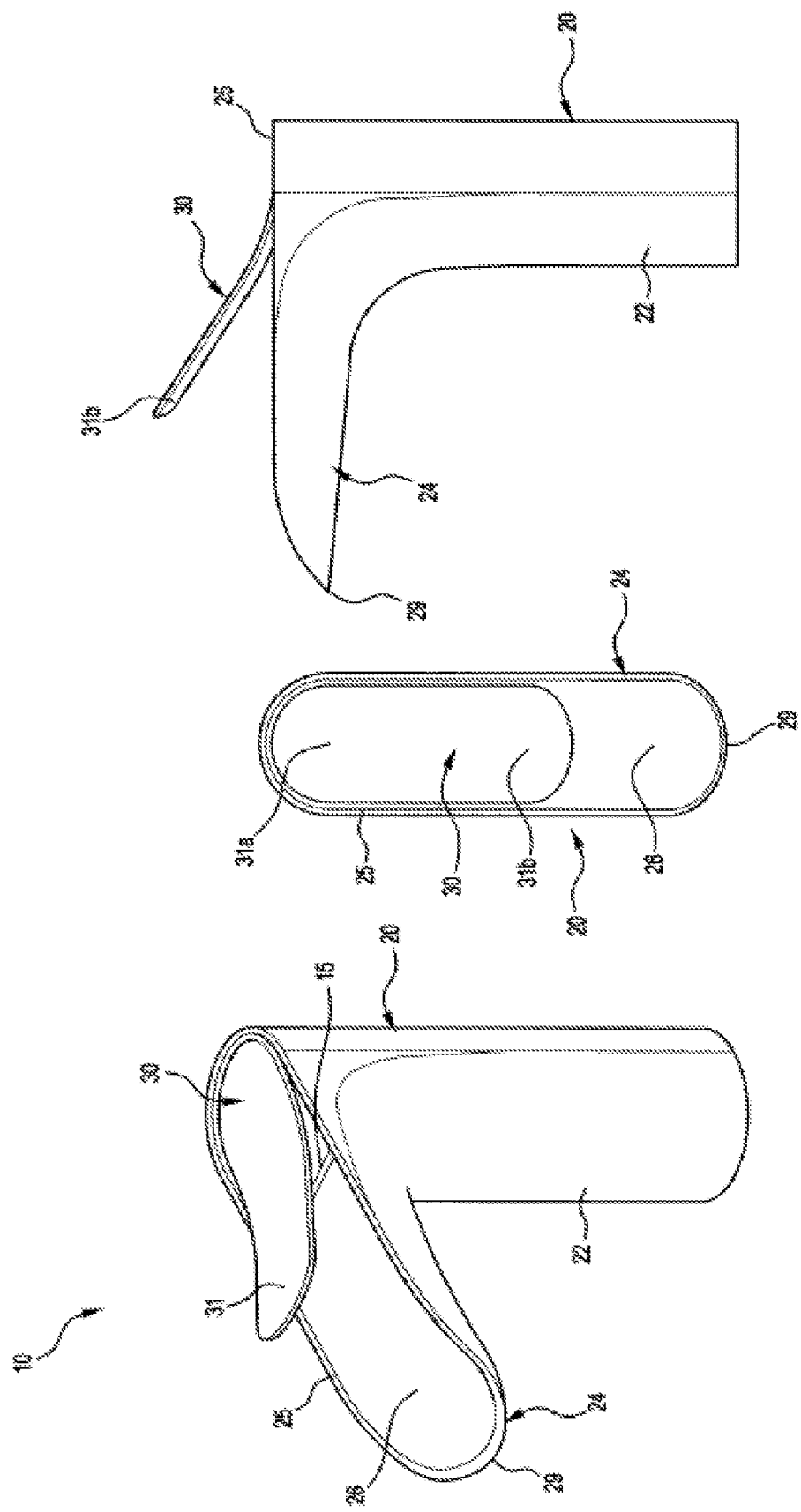
FIG. 1 is a front isometric view of a basin mixer with the lever handle in a central off position.
FIGS. 2 and 3 are respective plan and side elevation views of the basin mixer depicted in FIG. 1.

The illustrated basin mixer 10, as seen in its normal in situ orientation in FIGS. 1 to 3, includes a mixer body 20 configured to define a hollow upright post 22 and, at the top of the post, a laterally protruding arm 24. The upper edge of the mixer body 20 is defined by a rim 25 comprising parallel sides and semi-circular ends about a transversely concave shallow recess or channel 26. The inner end of recess 26 opens into the hollow interior of post 22. The end of rim 25 opposite arm 24 snugly receives one end of a lever handle 30 including a relatively thin blade 31.

From above, blade 31 exhibits parallel sides and semi-circular ends and snugly fits within rim 25 but is shorter than the rim at the outer end of the arm 24. As seen in the side view of FIG. 3, when lever handle 30 is in its central lowermost position blade 31 has a horizontal portion 31a atop post 22 that is substantially flush with rim 25. Blade 31 also has an upwardly turned grip portion 31b that is inclined at an angle between 20° and 25°, for example 22°, to the horizontal so as to leave a comfortable space between its underside and recess 26 in which to place a finger to manipulate the handle.

In operation, lever handle 30 is rotated vertically (i.e. about a transverse horizontal axis) to control the rate of flow of water from respective hot and cold water intakes to a mixer outlet and onto the outer part of recess 26. Lever handle 30 is also rotated left or right from a central position (FIG. 2) to control water temperature by varying the hot/cold water mix from the hot and cold water intakes.

Figure 4:
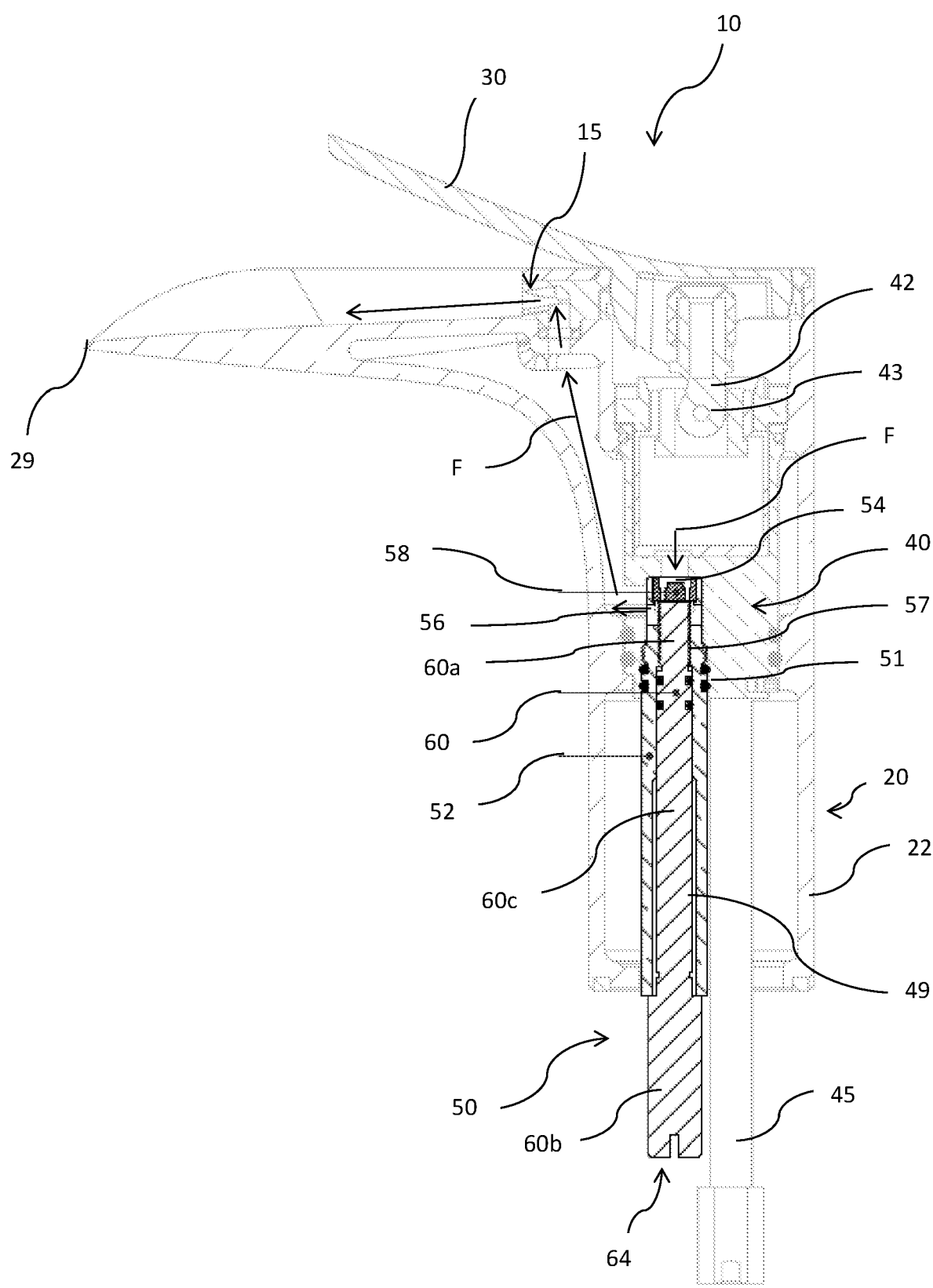
FIG. 4 is a vertical axial cross-section of an adjustable flow regulator mounted within the basin mixer of FIGS. 1 to 3 according to an embodiment of the invention.

In the conventional manner, the internal water control element of the mixer is a mixer cartridge 40 mounted within post 22 with an upwardly projecting mixer control element 42 pivoted to the cartridge body at a horizontal axis 43 (FIG. 4). The rate of flow of water from respective hot and cold water intakes 45 is adjustable by pivoting the mixer control element 42 from a vertically aligned off position (FIG. 4) to a forwardly inclined fully on position (not shown). The proportions of hot and cold water entering the mixer cartridge 40 are varied by rotating the mixer control element 42 about the vertical axis of the mixer cartridge 40 and post 22 to vary the proportions of hot and cold water delivered from the respective hot and cold water intakes 45. Mixer outlet 15 opens onto the recess 26 so that the mixed water flows along the recess and over its front lip 29. In this manner, the recess 26 and front lip 29 form a single mixer outlet or spout.

The adjustable flow regulator of the present invention will now be described in relation to its use in the basin mixer 10. The illustrated basin mixer 10 is of the type disclosed in International patent publication no. WO 2015/061846, the entire contents of which is hereby incorporated by reference. As described previously, the present adjustable flow regulator has application in other water mixers, and the structure of the illustrated basin mixer is merely exemplary only.

As shown in FIG. 4, a portion of the adjustable flow regulator 50 of the present invention is disposed in a fluid path F between the mixer cartridge 40 and the mixer outlet 15 of the basin mixer 10. The adjustable flow regulator 50 is housed or retained in the post 22 by a threaded engagement. A plurality of seals 51 are positioned around the regulator body 52.

The adjustable flow regulator 50 comprises a generally cylindrical elongate regulator body 52 having, at its upper end adjacent the mixer cartridge 40, a fluid inlet defined by a vertical opening 54 in fluid communication with an outlet of the mixer cartridge 40 to receive mixed water therefrom. The elongate body 52 further comprises a fluid outlet defined by a generally horizontal opening 56 generally adjacent to, but disposed lower than, the fluid inlet 54. Fluid outlet 56 may be any suitable opening (for example, a slit), but in the illustrated embodiment the outlet 56 comprises a pair of opposed generally rectangular openings. In use, mixed water exiting the mixer cartridge 40 travels along fluid path F, enters the fluid inlet 54 of the elongate body 52, and thereafter exits the elongate body via the fluid outlet 56. Fluid outlet 56 is in fluid communication with the mixer outlet 15 such that water exiting the adjustable flow regulator 50 is caused to exit the mixer outlet 15 and travel along recess 26 to lip 29.

Disposed within the fluid inlet 54 of the elongate body 52 is a flow regulating element 58. The flow regulating element 58 is a typical in-line flow regulating element, such as a Neoperl® flow-volume regulator, configured to restrict the flow of mixed water entering the adjustable flow regulator 50 to a predetermined flow rate, such as 4 L/min. The flow regulating element with an appropriate flow rate is preselected by the manufacturer of the basin mixer. The flow of mixed water exiting the mixer outlet 15 can then be adjustably restricted by the mechanism of the flow regulator according to the present invention, as outlined below.

The elongate body 52 of the adjustable flow regulator further defines a central longitudinal channel 49 with an internal thread 53 at its upper end, which threadingly retains a rotatable control element in the form of a generally cylindrical pin 60. Cylindrical pin 60 includes, along a portion of its length, an external thread which is received by the internal thread 53. The arrangement is such that the cylindrical pin 60 is rotatable within the central channel 49 of the body 52, and therefore, moveable in a longitudinal direction relative thereto. The cylindrical control pin 60 is configured such that its upper end 60a presents a restriction surface 62 (FIG. 5a) to mixed water within a space or void 55 in the fluid path F defined between the fluid inlet 54 and fluid outlet 56 of the body 52. The restriction surface 62 acts to reduce a cross-sectional area of the fluid path F by impinging into the void 55, and as a result, reduces or restricts the flow of mixed water exiting the fluid outlet 56 (and ultimately the mixer outlet 15).

Figures 5A, 5B, 5C:
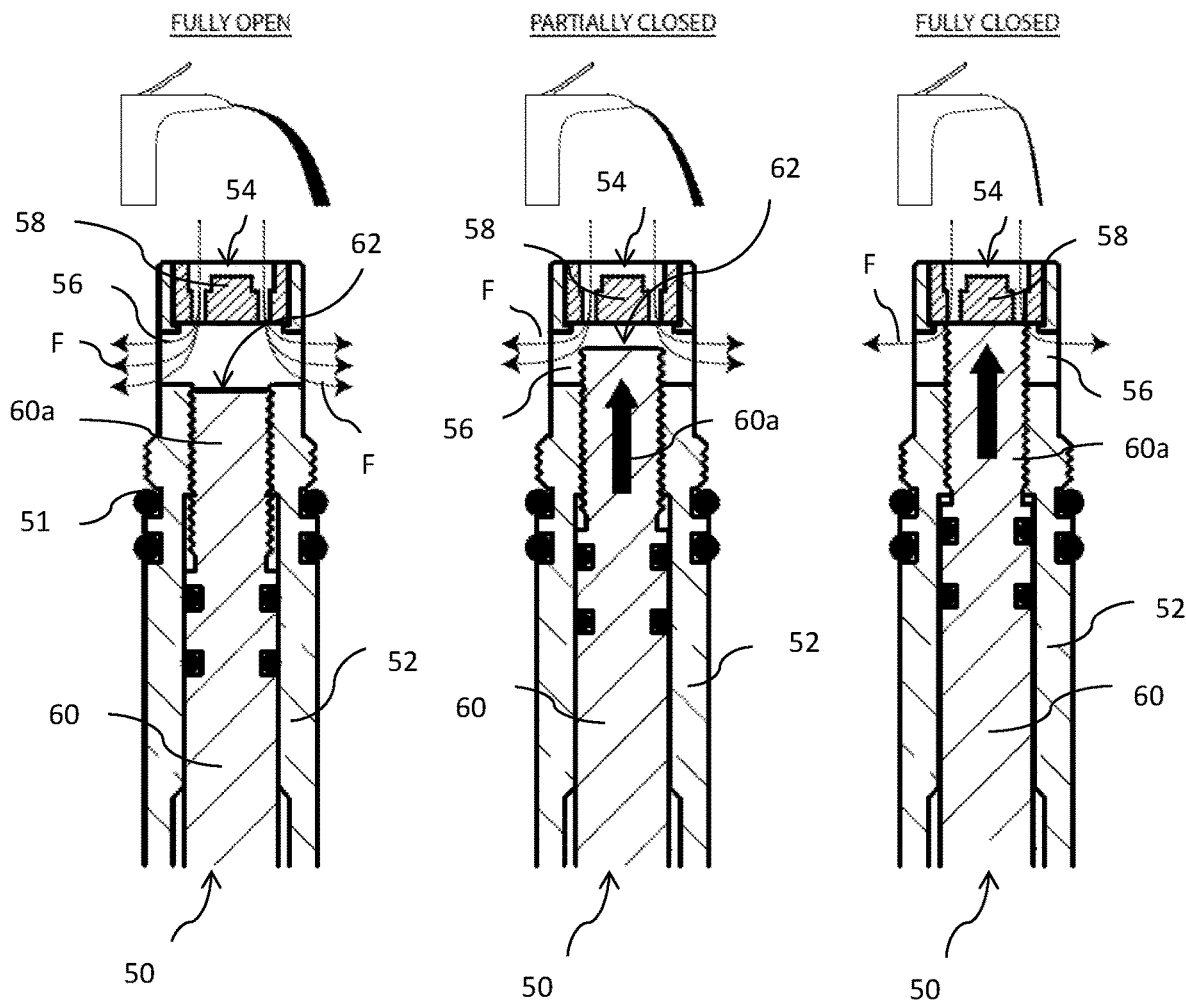
FIGS. 5a, 5b and 5c show a sequence of side views showing the manner in which the control element of the adjustable flow regulator is moveable to adjustably restrict flow of mixed water exiting the basin mixer.

The control element or pin 60 is moveable within the body 52 from a fully open position (FIG. 5a) to a fully closed position (FIG. 5c). In the fully open position the pin 60 does not impinge into void 55 and does not reduce the cross-sectional area of the fluid path F. In the fully closed position the restriction surface 62 impinges substantially into the void 55 providing a maximum reduction to the cross-sectional area of the fluid path F (but does not completely close the fluid path). The maximum reduction corresponding to a minimum flow rate that achieves the flow of mixed water exiting the mixer outlet. As described above, by adjustably reducing (or increasing) the cross-sectional area of the fluid path F, the flow of mixed water exiting the fluid outlet 56 is correspondingly reduced (or increased). Practically, by adjustably restricting the flow of mixed water exiting the mixer outlet 15, a landing position of the mixed water, for example in an underlying basin, is able to be controlled. As shown in FIG. 5c, when the adjustable flow regulator 50 is fully closed, the landing position of the mixed water is closer to the mixer body 20 than in the fully open position shown in FIG. 5a. The adjustable flow regulator 50 of the present invention is capable of adjusting the rate of flow of mixed water exiting the mixer outlet to a value between the minimum flow rate that achieves the flow of mixed water exiting the mixer outlet (i.e., some finite non-zero flow rate, for example, 0.5 L/min) and the predetermined flow rate as provided by the preselected flow regulating element 58 (e.g., 4 L/min).

Figure 6:
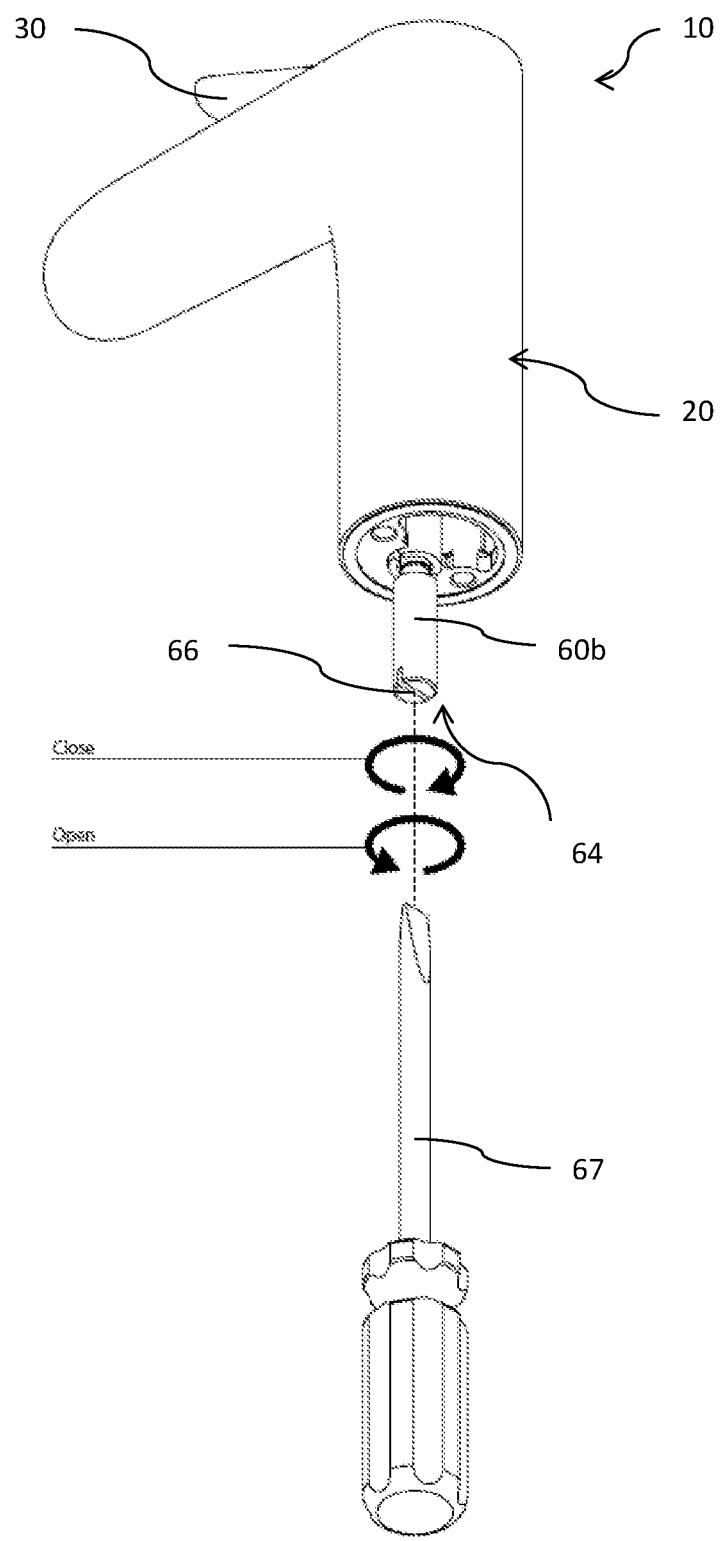
FIG. 6 is a rear isometric view of the basin mixer incorporating the adjustable flow regulator.

Conveniently, a lower end 60b of the control pin 60 defines a control surface 64 configured to receive a torque force. The control surface 64 includes an opening in the form of a central vertical slit 66 which is dimensioned to be complementary to a standard flat-blade screwdriver 67 (FIG. 6). The screw driver 67 is rotated to translate the control pin 60 vertically within the regulator body 52 between the fully open and fully closed positions (and plural positions therebetween).

As shown in the figures, a length of the control pin 60 is greater than a length of the elongate regulator body 52 and the mixer post 22 such that the control surface 64 is accessible from outside the regulator body 52, and importantly outside the mixer body 20. Advantageously, this allows for the control pin 60, and therefore the adjustable flow regulator 50, to be easily adjusted by a person when the water mixer 10 is located in situ, for example, in a bathroom vanity unit. To adjustably restrict the flow of mixed water exiting the water mixer 10, and thereby control the landing position of the mixed water, a person can simply rotate the control pin 60 via a screwdriver 67 received in the vertical slit 66 of the control surface 64 as shown in FIG. 6. Access to the control pin 60 can be obtained from within the bathroom vanity unit.

The control pin 60 has a stepped diameter, such that the diameter at the upper end 60a is greater than the lower end 60b and the central portion 60c. The lower step 61b is positioned to abut against the lower end of the regulator body 52. The upper step 61a is positioned to abut against a corresponding step 57 on the inside of the channel 49. These stop points allow the uppermost position of the control pin 60 to be set, such that a minimal cross-sectional area of the fluid path F can be maintained.

The adjustable flow regulator of the present invention may be manufactured from any suitable material known to those skilled in the art, but preferably comprises brass.

The present invention provides an adjustable flow regulator that can be readily accessed and adjusted to suit the environment during installation or after installation by a non-skilled person.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A water mixing faucet comprising:
   an adjustable flow regulator having a regulator body and a control element, wherein the control element is moveable within the regulator body adjustably restricting a fluid flow path and thereby flow of mixed water to a fluid outlet of the adjustable flow regulator; and
   a mixer cartridge which mixes hot and cold water thus producing mixed water;
   wherein the mixed water flows from an outlet of the mixer cartridge to an inlet of the adjustable flow regulator; and
   wherein the mixer cartridge is seated to the inlet of the adjustable flow regulator.

2. The adjustable flow regulator of claim 1, wherein the control element adjustably restricts the flow of mixed water by presenting a restriction surface to mixed water within the regulator body, which restriction surface reduces a cross-sectional area of the fluid path.

3. The adjustable flow regulator of claim 2, wherein the control element is moveable from a fully open position in which the restriction surface does not reduce the cross-sectional area of the fluid path to a fully closed position in which the restriction surface provides a maximum reduction to the cross-sectional area of the fluid path.

4. The adjustable flow regulator of claim 1, wherein the control element has a control surface configured to receive a force to thereby move the control element within the regulator body.

5. The adjustable flow regulator of claim 4, wherein a length of the control element is greater than a length of the regulator body such that the control surface is accessible from outside the regulator body.

6. The adjustable flow regulator of claim 4 or 5, wherein the control surface includes an opening dimensioned to receive a tool that produces the force.

7. The adjustable flow regulator of claim 1, wherein the control element is threadably received within a channel in the regulator body.

8. The adjustable flow regulator of claim 1, wherein the fluid inlet includes a flow regulating element that is configured to restrict flow of mixed water entering the fluid inlet to a predetermined flow rate.

9. The adjustable flow regulator of claim 1, wherein, in use, the adjustable flow regulator is adjustable to control a landing position of mixed water exiting the mixer outlet.

\* \* \* \* \*